(12) United States Patent  
Yamashita

(10) Patent No.: US 7,024,671 B2
(45) Date of Patent: Apr. 4, 2006

(54) SCHEDULING APPARATUS PERFORMING JOB SCHEDULING OF A PARALLEL COMPUTER SYSTEM

(75) Inventor: Koichiro Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 09/774,937

(22) Filed: Jan. 31, 2001

(65) Prior Publication Data

US 2002/0002578 A1 Jan. 3, 2002

(30) Foreign Application Priority Data

Jun. 22, 2000 (JP) ............................. 2000-187317

(51) Int. Cl.
*G06F 9/46* (2006.01)
(52) U.S. Cl. ....................... 718/102; 718/105
(58) Field of Classification Search ......... 718/100–106
See application file for complete search history.

(56) References Cited

U.S. PATENT DOCUMENTS

| | | | | |
|---|---|---|---|---|
| 5,410,696 A | * | 4/1995 | Seki et al. ................... | 717/149 |
| 5,625,832 A | * | 4/1997 | Ohsawa et al. ................ | 712/28 |
| 5,630,129 A | * | 5/1997 | Wheat ......................... | 718/105 |
| 5,978,583 A | * | 11/1999 | Ekanadham et al. ......... | 717/106 |
| 6,292,822 B1 | * | 9/2001 | Hardwick .................... | 718/105 |
| 6,345,287 B1 | * | 2/2002 | Fong et al. .................. | 718/102 |
| 6,687,257 B1 | * | 2/2004 | Balasubramanian ......... | 370/429 |
| 6,829,764 B1 | * | 12/2004 | Cohen et al. ................ | 718/103 |

FOREIGN PATENT DOCUMENTS

| | | |
|---|---|---|
| JP | 10333929 A | 12/1998 |
| JP | 13338719 A | 12/1999 |

OTHER PUBLICATIONS

Barbosa da Silva, Fabricio Alves et al. "Towards Flexibility and Scalability in Parallel Job Scheduling." Proceedings of the IASTED International Conference, Parallel and Distributed Computing and Systems. Nov. 3-6, 1999.*

* cited by examiner

*Primary Examiner*—Lewis A. Bullock, Jr.
(74) *Attorney, Agent, or Firm*—Greer, Burns & Crain, Ltd.

(57) ABSTRACT

A job entered into a processor element (PE) of a parallel computer system is moved to a different PE, or written to an external auxiliary storage device by being frozen, with dynamic scheduling. A scheduler estimates the remaining time of execution of each job, compares with a migration/freezing cost, and determines a job to be moved/frozen.

10 Claims, 21 Drawing Sheets

| JOB NAME | JOB ID | PRIORITY | DEGREE OF PARALLELISM | MEMORY SIZE | JOB ENTRY TIME | IDLE TIME |
|---|---|---|---|---|---|---|
| job_XX | 105 | 1 | 6 | 100 | 990802083000 | 0 |
| job_AA | 110 | 1 | 8 | 100 | 990802090000 | 0 |
| job_BB | 107 | 1 | 6 | 50 | 990802084500 | 0 |
| job_YY | 99 | 2 | 8 | 100 | 990802080000 | 0 |
| ... | | | | | | |
| job_ZZ | 100 | 10 | 1 | 50 | 990802081000 | 5 |
| job_CC | 123 | 10 | 2 | 75 | 990802081500 | 10 |

FIG. 7

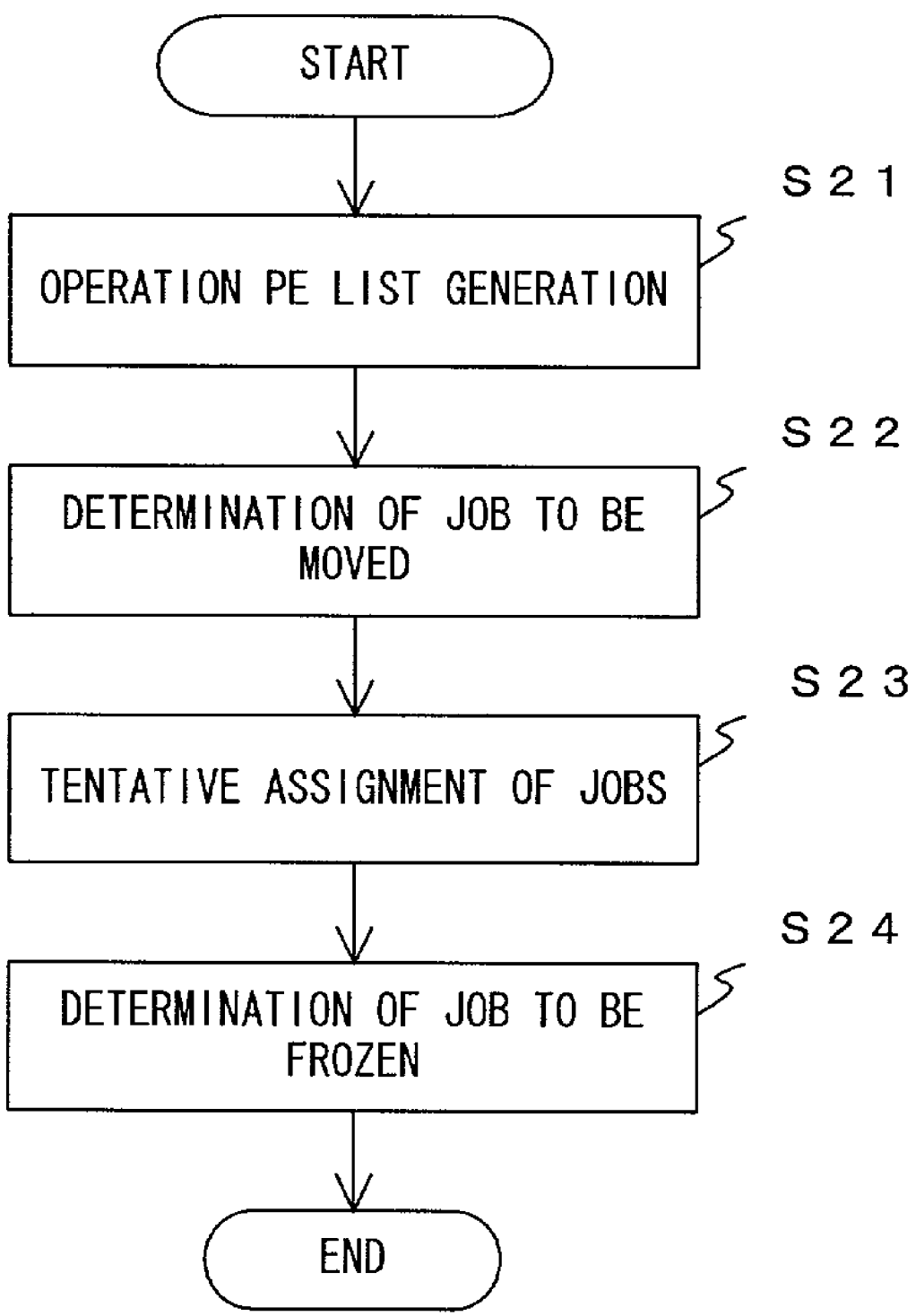
F I G. 14

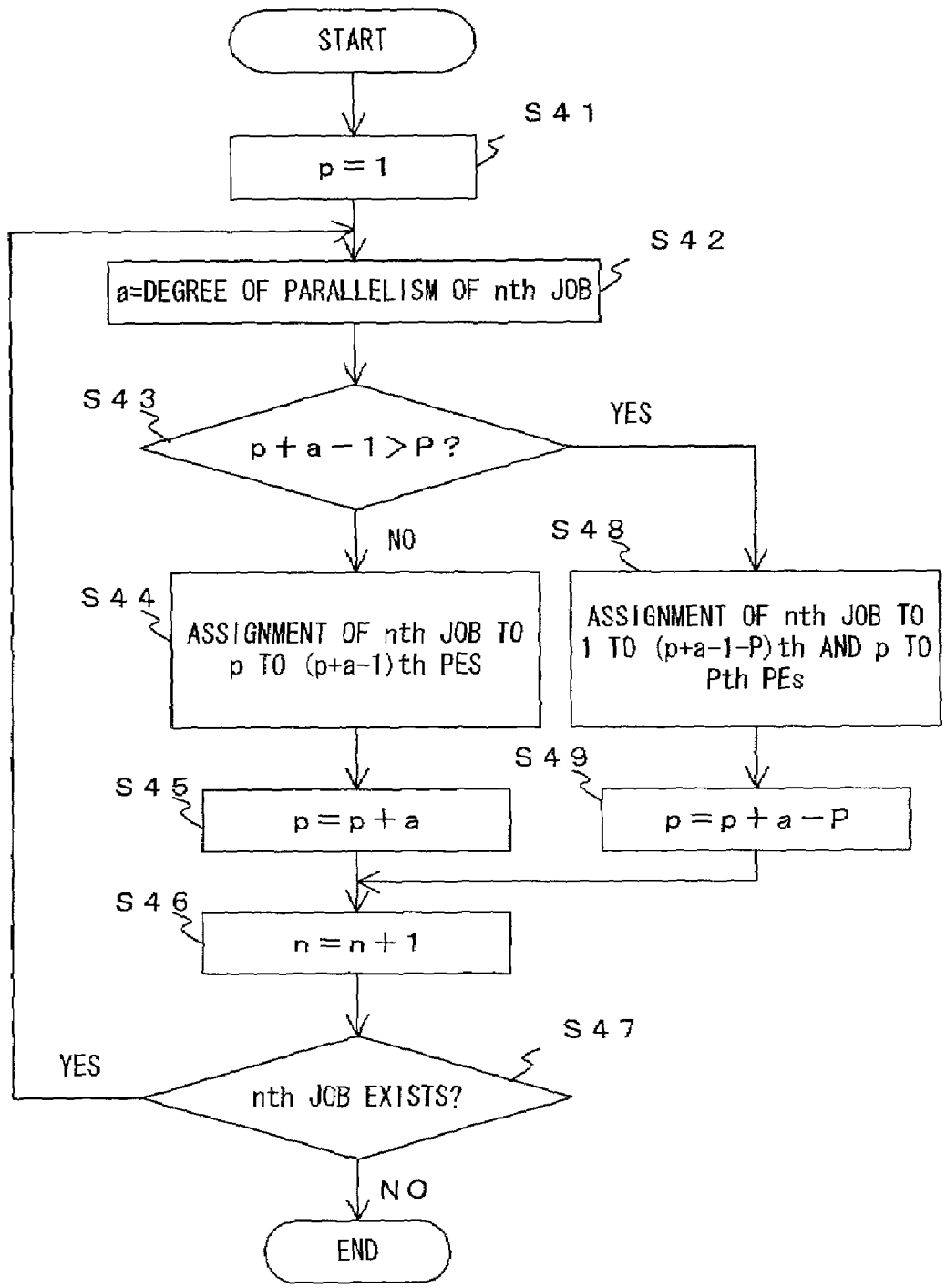
F I G. 1 6

|  | SEQUENTIAL EXECUTION | QUEUE SCHEDULING | HIERARCHICAL SCHEDULING | | |
|---|---|---|---|---|---|
|  |  |  | $\delta 0=25$ | $\delta 0=50$ | $\delta 0=75$ |
| TOTAL EXECUTION TIME [sec] | $8.56 \times 10^6$ | $6.22 \times 10^6$ | $5.48 \times 10^6$ | $5.62 \times 10^6$ | $5.71 \times 10^6$ |
| PERFORMANCE RATIO (SEQUENCE=1) | 1 | 0.72 | 0.64 | 0.65 | 0.66 |
| PERCENTAGE OF MEMORY USE [%] | 23 | 34 | 52 | 49 | 48 |

FIG. 19

|  | SEQUENTIAL EXECUTION | QUEUE SCHEDULING | HIERARCHICAL SCHEDULING | | |
|---|---|---|---|---|---|
|  |  |  | $\delta_0=25$ | $\delta_0=50$ | $\delta_0=75$ |
| TOTAL EXECUTION TIME [sec] | $6.12\times10^6$ | $5.62\times10^6$ | $4.89\times10^6$ | $4.10\times10^6$ | $5.01\times10^6$ |
| PERFORMANCE RATIO (SEQUENTIAL = 1) | 1 | 0.91 | 0.80 | 0.67 | 0.82 |
| PERCENTAGE OF MEMORY USE [%] | 25 | 36 | 55 | 57 | 52 |

FIG. 20

|  | SEQUENTIAL EXECUTION | QUEUE SCHEDULING | HIERARCHICAL SCHEDULING | | |
|---|---|---|---|---|---|
|  |  |  | $\delta_0 = 25$ | $\delta_0 = 50$ | $\delta_0 = 75$ |
| TOTAL EXECUTION TIME [sec] | $5.68 \times 10^6$ | $5.49 \times 10^6$ | $5.12 \times 10^6$ | $5.03 \times 10^6$ | $4.78 \times 10^6$ |
| PERFORMANCE RATIO (SEQUENTIAL=1) | 1 | 0.97 | 0.90 | 0.88 | 0.84 |
| PERCENTAGE OF MEMORY USE [%] | 21 | 33 | 48 | 45 | 50 |

F I G. 2 1

SCHEDULING APPARATUS PERFORMING JOB SCHEDULING OF A PARALLEL COMPUTER SYSTEM

BACKGROUND OF THE INVENTION

1. Field of the Invention

The present invention relates to a scheduling apparatus dynamically performing job scheduling in a parallel computer system.

2. Description of the Related Art

In a conventional parallel computer system, job scheduling is performed to efficiently use computer resources such as a CPU (Central Processing Unit), memory, etc. Here, the minimum unit of a program executed in a computer system is defined to be a process, and a unit executed in parallel as a process complex is defined to be a job.

As a scheduling method such as management of a job queue waiting to be processed, the following methods are mainly used.

(1) Successive insertion/execution operations of jobs according to FIFO (First In First Out)

(2) Sorting (scheduling) operation of jobs within a queue according to priorities With the method (2), a priority flag, etc. is attached to each job. Even if a job is inserted in a queue later, control such that the job is inserted in the beginning of the queue is performed if its priority is high. In addition to these methods, various scheduling methods were proposed to insert a job.

However, the above described conventional scheduling methods have a problem of being unable to cope with associated uncertainties after job insertion.

When a job is to be executed, it is difficult to accurately grasp an actual execution time prior to execution. This is because job execution includes uncertainties such as a conflict of resources between one process and a different PE, an external input/output, etc., if control by an OS (Operating System) is assumed.

In this case, if scheduling is performed with a scheduling method which does not accurately manage an execution time, a scheduling error becomes larger as job execution proceeds. As a result, a situation where a load imbalance occurs in a particular PE (Processor Element) occurs, leading to an inefficient use of the parallel computer system. Furthermore, as long as an OS manages a plurality of processes, an occurrence of a scheduling error caused by such uncertainties is inevitable.

SUMMARY OF THE INVENTION

An object of the present invention is to provide a scheduling apparatus reducing a scheduling error accompanying job execution, and improving use efficiency of computer resources in a parallel computer system.

In a first aspect of the present invention, a scheduling apparatus comprises a determining device and an assigning device, and performs job scheduling of a parallel computer system having a plurality of PEs.

The determining device determines whether or not to migrate (move) a certain job being executed by a PE to a different PE. The assigning device assigns a job being executed to a plurality of PEs so that the migration process of the job is performed, if it is determined that the job is to be moved to a different PE.

In a second aspect of the present invention, a scheduling apparatus comprises a static scheduling device and a dynamic scheduling device, and performs job scheduling of a parallel computer system having a plurality of PEs.

The static scheduling device performs scheduling of a job in a static state or in the case where the configuration of the parallel computer system is fixed. In the meantime, the dynamic scheduling device performs scheduling of a job in a running state or in the case where the configuration of the parallel computer system is changeable.

BRIEF DESCRIPTION OF THE DRAWINGS

FIG. 7 exemplifies a job information table;
FIG. 14 is a flowchart showing a relocation list generation process;
FIG. 16 is a flowchart showing an assignment process;
FIG. 19 shows a first simulation result;
FIG. 20 shows a second simulation result;
and
FIG. 21 shows a third simulation result.

DESCRIPTION OF THE PREFERRED EMBODIMENTS

Hereinafter, preferred embodiments according to the present invention will be described in detail by referencing the drawings.

Figure 1:
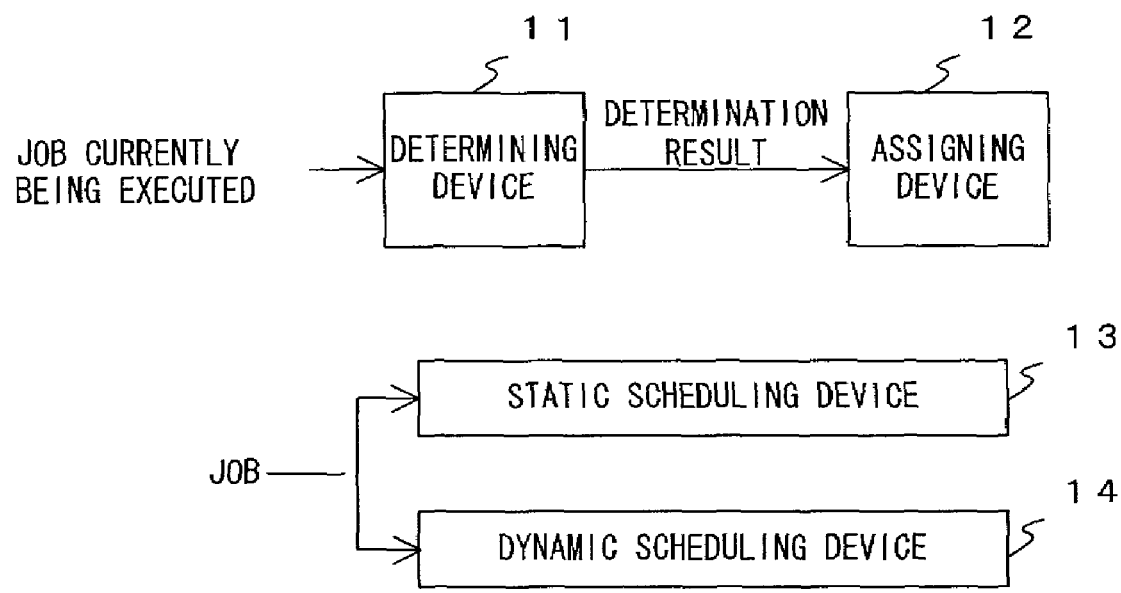
FIG. 1 shows the principle of a scheduling apparatus according to the present invention.

FIG. 1 shows the principle of a scheduling apparatus according to the present invention.

In a first aspect of the present invention, a scheduling apparatus comprises a determining device 11 and an assigning device 12, and performs job scheduling of a parallel computer system having a plurality of PEs.

The determining device 11 determines whether or not to migrate (move) a job being executed by a PE to a different PE. The assigning device 12 assigns a job being executed to the plurality of PEs so that the migration process of the job is performed, if it is determined that the job is to be moved to the different PE.

The job migration process indicates a process for moving a job being executed by one PE to a different PE as the job continues to be executed. The determining device 11 determines whether or not to move a job to a different PE, and passes a determination result to the assigning device 12. Upon receipt of the determination result indicating that the job is to be moved to the different PE, the assigning device 12 assigns the job to the different PE, and reassigns a different job being executed.

With such a scheduling apparatus, job scheduling considering a job migration process is performed, whereby a job location on a PE can be suitably changed even if a scheduling error arises during job execution. Accordingly, a scheduling error is reduced, whereby the use efficiency of computer resources is increased.

In a second aspect of the present invention, a scheduling apparatus comprises a static scheduling device 13 and a dynamic scheduling device 14, and performs job scheduling of a parallel computer system having a plurality of PEs.

The static scheduling device 13 performs static scheduling, while the dynamic scheduling device 14 performs dynamic scheduling in combination with the static scheduling.

The static scheduling device 13 performs scheduling, for example, of a job in a static state, or in the case where the configuration of the parallel computer system is fixed. The dynamic scheduling device 14 performs scheduling, for example, of a job in a running state, or in the case where the configuration of the parallel computer system is changeable.

With such a scheduling apparatus, overall scheduling into which static scheduling and dynamic scheduling are combined is performed. Accordingly, even if a scheduling error accompanying job execution occurs, the error is reduced by dynamically changing a job location on a PE, leading to an increase in the use efficiency of computer resources.

Figure 2:
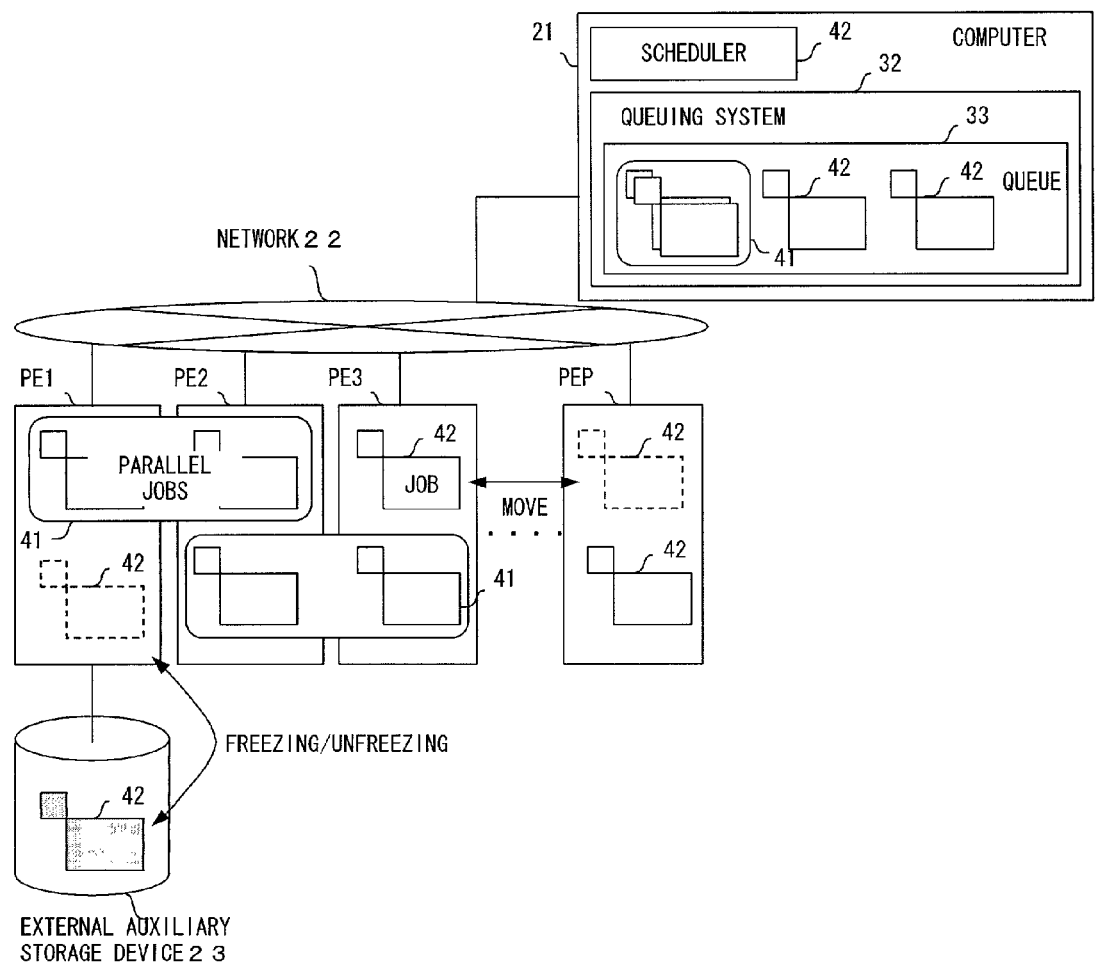
FIG. 2 shows the configuration of a parallel computer system.

For example, the determining device 11, the assigning device 12, the static scheduling device 13, and the dynamic scheduling device 14, which are shown in FIG. 1, correspond to a scheduler 31 which is shown in FIG. 2 and will be described later.

In this preferred embodiment, concepts of "static" and "dynamic" are adopted for job scheduling. Scheduling which relates to the static state of a job or the static (fixed) state of a system is referred to as "static scheduling", while scheduling which relates to the running state of a job or the fluctuation state of a system is referred to as "dynamic scheduling".

Here, the static state of a job corresponds to the state where a job is within a queue waiting to be processed, or the (frozen) state where a job is stored in an external auxiliary storage device such as a disk, etc., while the running state of a job corresponds to the state where a job is being executed on a parallel computer system. Additionally, the static state of a system corresponds to the state where a system is stably running without changing a system configuration during running, while the fluctuation state of a system corresponds to the state where a system configuration is changed by maintenance, etc. depending on need during running.

Not only by rearranging jobs in a queue with static scheduling, but also by performing scheduling considering an operation for freezing or moving a running job with dynamic scheduling, computer resources can be used more effectively. Therefore, this preferred embodiment adopts the following methods in order to effectively use computer resources.

(1) Absorbing a scheduling error caused by uncertainties such as an execution time, etc., with static scheduling.

(2) Performing static scheduling for a queue or an external auxiliary storage device in order to effectively perform dynamic scheduling.

(3) Releasing some of PE resources by changing a job assigned on a parallel computer system with dynamic scheduling, and performing partial maintenance for the system.

(4) Performing overall scheduling into which dynamic scheduling and static scheduling are combined.

(5) Accumulating data of a previous job running state, and estimating an execution time of a current job.

Additionally, an optimization problem of a job execution location with scheduling is generally an NP (Non-Polynomial) hard problem, and there are no effective formulas for obtaining an optimum solution. Therefore, in this preferred embodiment, scheduling is performed based on an approximate optimum solution obtained with an empirical (heuristic) solution.

To implement such job scheduling, a parallel computer system comprising the following hardware and software is assumed.

Hardware (1) System comprising a plurality of PEs that can execute jobs in parallel (2) Network system interconnecting the PEs (3) External auxiliary storage device such as a disk device, etc., and its input/output mechanism Software (1) OS that can control (execute) a plurality of processes (2) Job freezing capability for freezing a running job, and writing the job to the external auxiliary storage device as a file image (3) Job migration capability for moving a running job to a different PE (4) Queuing system for managing job insertion/execution with a queue (5) Interface capability for learning the degree of parallelism of a job (6) Interface capability for learning the memory size of a job (7) Interface capability for specifying the execution priority of a job Here, job freezing means that job execution is suspended, and data (part or the whole of information about a job) representing the running state at that time is packed in a file and stored outside a PE. The degree of parallelism of a job indicates the number of PEs required to execute the job, and the memory size of a job indicates the memory amount used by the job.

FIG. 2 shows the configuration of such a parallel computer system. The system shown in FIG. 2 comprises a computer 21 and "P" PEs (PE1, PE2, PE3, ..., PEP), which are interconnected by a network 22. To each of the PEs, an external auxiliary storage device 23 can be connected depending on need. Here, the external auxiliary storage device 23 is connected to the PE 1 if necessary. As the external auxiliary storage device 23, for example, a magnetic disk device, an optical disk device, a magneto-optical disk device, a tape device, etc. are used.

Figure 3:
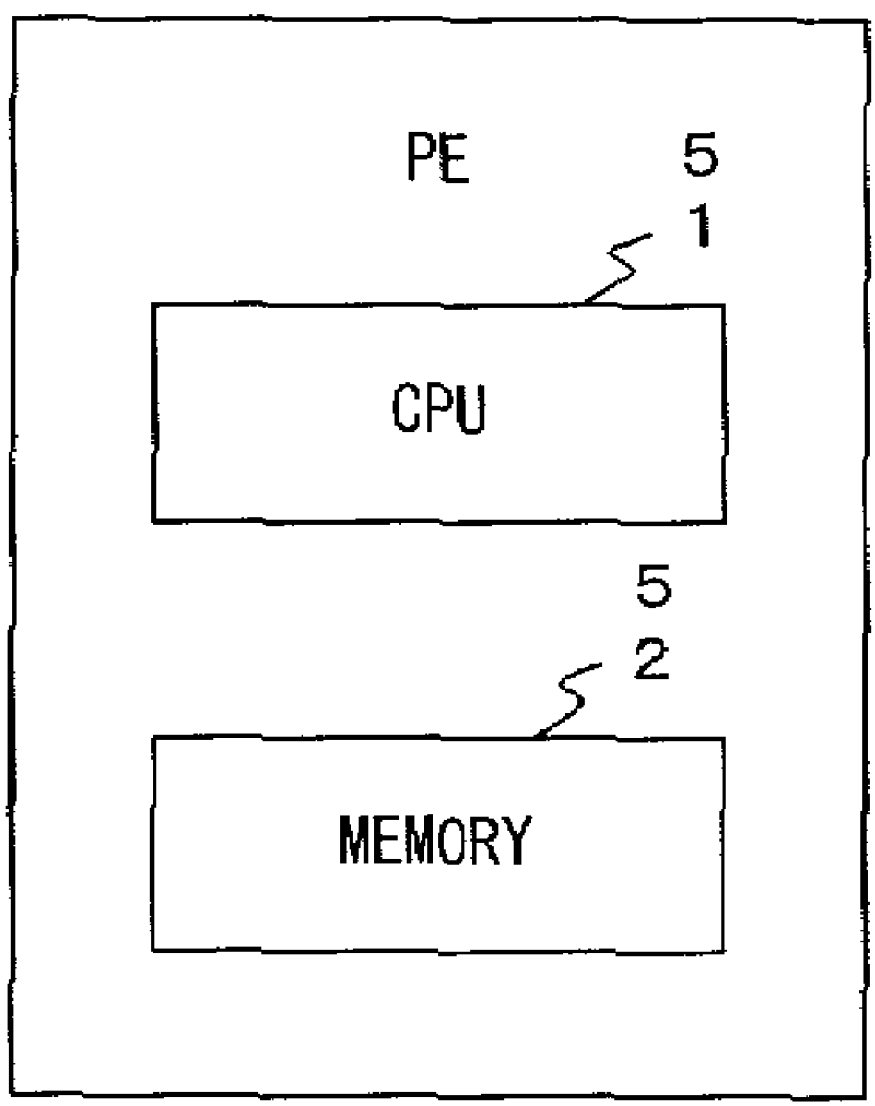
FIG. 3 shows the configuration of a PE.

The computer 21 comprises a scheduler 31 and a queuing system 32. The queuing system 32 includes a queue waiting to be processed 33, and manages the order of jobs waiting to be processed 41 and 42. The scheduler 31 performs dynamic and static scheduling in accordance with the above described methods. Each of the PEs comprises a CPU 51 and a memory 52 as shown in FIG. 3, and executes the jobs 41 and 42.

The jobs 41 and 42 entered from the queuing system 32 into the PEs are moved to different PEs, or frozen and written to the external auxiliary storage device 23 with dynamic scheduling. Here, the job 41 corresponds to parallel jobs executed on a plurality of PEs, while the job 42 corresponds to a job executed on one PE.

The frozen job is then read from the external auxiliary storage device 23 and unfrozen, so that its operations are continued (resumed). Here, job unfreezing represents a process for restoring the information of a job that is frozen and stored in the external auxiliary storage device 23 on a PE. The PE on which the job is unfrozen is the PE that freezes the job or a different PE. If the PE on which the job is unfrozen is different from the original PE, the job will move eventually.

By freezing or moving a job currently being executed in a parallel computer system as described above, an inefficient state such as an unnecessary idle state, etc. of computer resources is improved, and the original performance of the system can be fully utilized. Furthermore, a partial maintenance operation of a system can be dynamically performed by releasing a particular PE resource with freezing or migration. Consequently, a parallel computer system can be utilized more efficiently.

The parallel computer system shown in FIG. 2 performs scheduling in respective hierarchies grouped from the following viewpoints, and rearranges jobs.

(1) First Hierarchy

Sequential process at the start-up of a system (from when the system starts up until when a queue is filled with jobs)

(2) Second Hierarchy

Static scheduling of a job within a queue (3) Third Hierarchy

Dynamic scheduling when a job is entered from a queue into a PE (input/output between the PE and an external auxiliary storage device)

(4) Fourth Hierarchy

Dynamic scheduling of a job currently being executed on a PE

Scheduling in each of the first to the fourth hierarchies will be described in detail below by referencing FIGS. 4 through 16.

Figure 4:
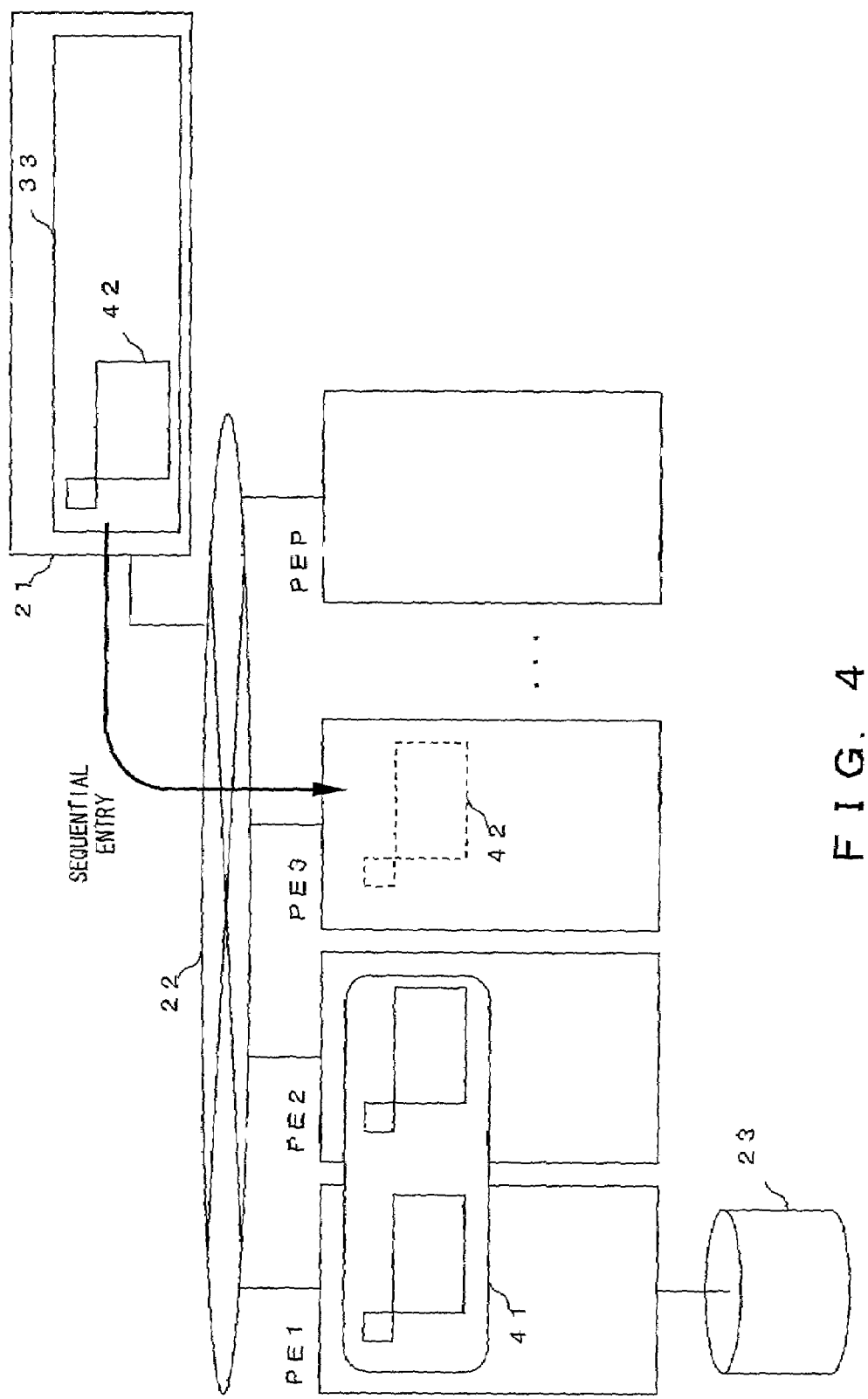
FIG. 4 shows first scheduling.

FIG. 4 shows the scheduling in the first hierarchy. This hierarchy handles the state where a system starts up, that is, the state where no subsequent job exists in the queue 33, and computer resources are unused. In this case, the scheduler performs scheduling such that jobs are sequentially inserted according to FIFO.

In FIG. 4, the job 42 is inserted in the queue 33 within the queuing system while the parallel jobs 41 are executed on the PEs 1 and 2. However, since the resources PE3 through PEP are unused, the job 42 is immediately executed. As described above, the system is in a state where a job inserted in the queue 33 can be executed sequentially.

Figure 5:
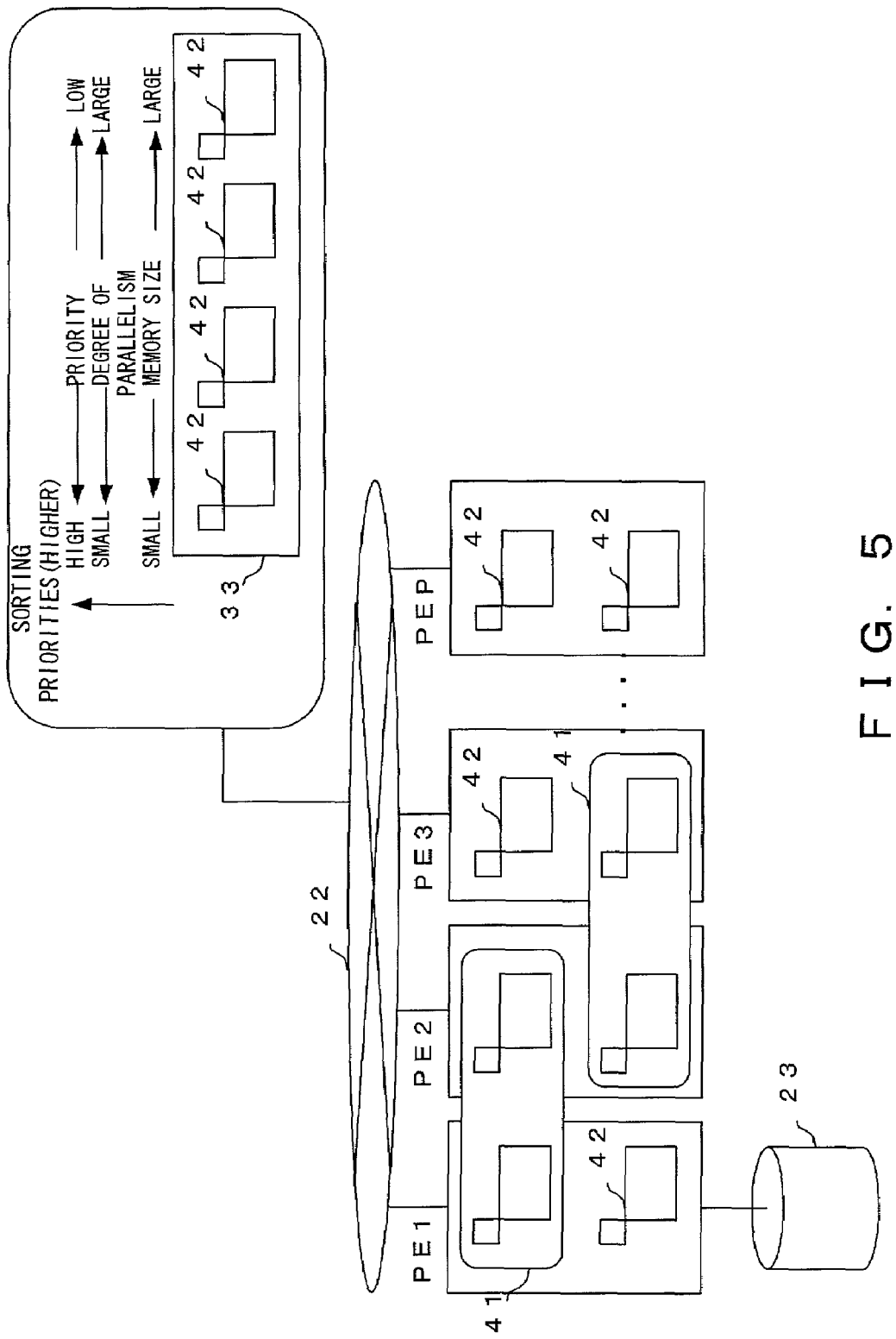
FIG. 5 shows second scheduling.

FIG. 5 shows the scheduling in the second hierarchy.

This hierarchy handles the state where available resources are insufficient, and jobs are accumulated in the queue 33 after the sequential process is continued in the first hierarchy. In this case, the scheduler rearranges the jobs within the queue 33, and moves the job that can be most effectively inserted in the beginning of the queue 33, by the time any of the jobs on the PEs terminates, and the next job can be executed.

Here, the scheduler sorts the jobs within the queue 33 according to the following priorities. This sorting process is performed, for example, each time a new job is inserted in the queue 33.

(1) Sorting in descending order of a priority (the degree of urgency)

(2) Sorting in ascending order of the degree of parallelism (3) Sorting in ascending order of a memory size With such a sorting process, jobs are classified and sorted according to a priority, and the jobs having the same priority are then sorted in ascending order of the degree of parallelism/a memory size. In other words, the jobs are rearranged so that a small-scale job with higher priority is executed as early as possible.

The reason is that, empirically, the execution time of a job with a lower degree of parallelism and a smaller memory size is considerably short, and also the time required for a freezing or a migration operation when a job is frozen or moved is short. By executing jobs with a short execution time and high mobility early as described above, they can be terminated in a considerably early phase.

Figure 6:
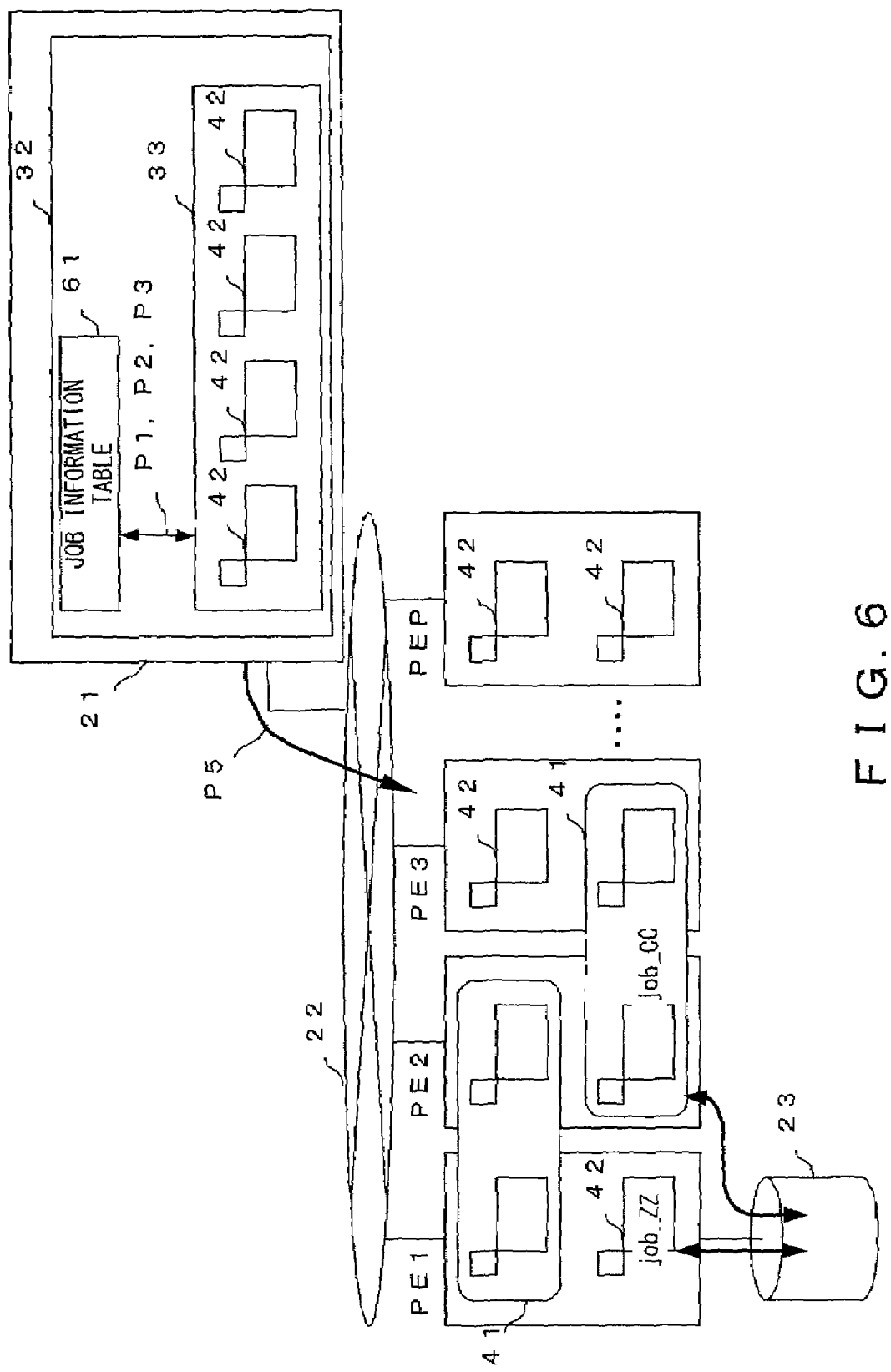
FIG. 6 shows third scheduling.

FIG. 6 shows the scheduling in the third hierarchy. In this hierarchy, scheduling is performed at the timing when a job is actually entered from the queue 33 into a PE, and executed.

In this case, the queuing system 32 holds a job information table 61 for managing the information about jobs currently being executed, and the scheduler sorts the jobs within the job information table 61 according to the following priorities in preparation for the freezing or the migration of a job. This sorting process is performed, for example, each time the scheduling is performed in each hierarchy.

(1) Sorting in descending order of a priority (2) Sorting in ascending order of the degree of parallelism (3) Sorting in descending order of a memory size FIG. 7 exemplifies the job information table 61. In the job information table shown in FIG. 7, information items such as the name of a job currently being executed, identification information (ID), priority, the degree of parallelism, memory size, a job entry time, idle time, etc. are registered. The job entry time among these items indicates the execution start date and time of a job, and the idle time indicates the time period during which execution is suspended by a freezing process, etc.

For example, if scheduling is performed in the second hierarchy, the scheduler makes a comparison between the beginning of the queue 33 and the first job in the job information table 61. If the priority of the former is higher than that of the latter, the job currently being executed is frozen and saved in the external auxiliary storage device 23, and some of the resources are made unused. In this way, the jobs within the job information table 61 are rearranged, and the first job in the queue 33 is preferentially executed.

Here, the scheduler selects a job to be saved with the following procedure. In this procedure, the degree of parallelism and the memory size of a job are collectively referred to as a job size.

P1: The job information table 61 is searched from its end, and the job of the largest size is selected from among the jobs which are currently being executed and do not exceed the size required by the first job in the queue 33. If such a job does not exist, the last job in the job information table 61 is selected.

P2: The difference between the size of the first job in the queue 33 and that of the job selected from the job information table 61 is obtained with the following equation, and the processes of P1 and P2 are repeated by using the obtained difference as a necessary size.

size difference=the size of the first job in a queue− sum of the sizes of jobs selected from the job information table     (1)

If the difference between the sizes results in "0" or a negative value, this process is terminated.

P3: The estimated termination time of each job and the time required to freeze the selected job are calculated from the information in the job information table 61, and it is determined whether or not the total execution cost (total execution time) increases due to an overhead by rearrangement. If the total execution cost increases, this scheduling is aborted and the termination of a job on a PE by the PE itself is waited. The method calculating the execution cost of a job will be described later.

P4: If the total execution cost does not increase, it is determined to be appropriate to interchange the selected job and the first job in the queue 33. The selected job is then frozen and saved in the external auxiliary storage device 23. In this way, resources for the first job in the queue 33 are secured.

P5: Entering the first job in the queue 3 into the PE, which is made to execute the job.

In FIG. 6, two jobs job_ZZ and job_CC running on the PE1 through PE 3 are selected, and saved in the external auxiliary storage device 23. The first job in the queue 33 is then executed by using the resources that are made unused.

With such scheduling, a job with higher priority within the queue 33 can be executed with higher precedence than that of a running job with lower priority. Furthermore, a job suitable for being saved can be selected with ease by sorting the jobs within the job information table 61 according to a priority/the degree of parallelism/a memory size, thereby performing the most efficient save operation.

Next, the scheduling in the fourth hierarchy will be described. In this hierarchy, the scheduler performs scheduling of a job currently being executed and a job currently being frozen and saved, so as to disperse the loads on PEs and maintain the system. These jobs are registered in the above described job information table. Here, dynamic scheduling is performed by assuming the migration for moving a job currently being executed to a different PE within the system unchanged, and a change in the system configuration during operation.

By way of example, if jobs of a heavy process, which consume a lot of CPU and memory resources, concentrate on one PE, the loads on the PEs can be averaged by moving the jobs to different PEs having more of unused resources. Consequently, the processing time of the entire system can be shortened.

Figure 8:
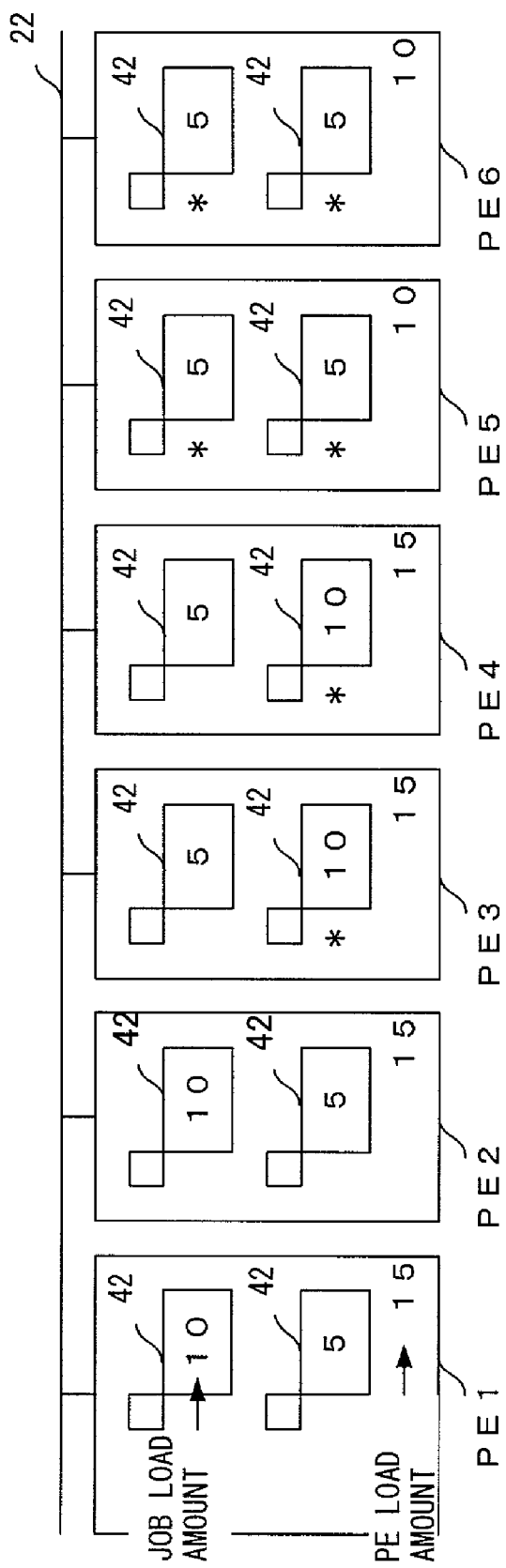
FIG. 8 shows a first load distribution.

FIG. 8 exemplifies a load distribution while a system is being operated. In this example, 6 PEs PE1 through PE6, which respectively execute two jobs 42, are running. Numerals within the rectangles of the jobs 42 indicate the load amounts of the jobs, while numerals within the rectangles of the PEs indicate the load amounts on the PEs. The load amount on a PE corresponds to the sum of the load amounts of the jobs on the PE. For example, the load amounts of the two jobs 42 on the PE1 are respectively "10" and "5", so that the load amount on the PE 1 is therefore "15".

Figure 9:
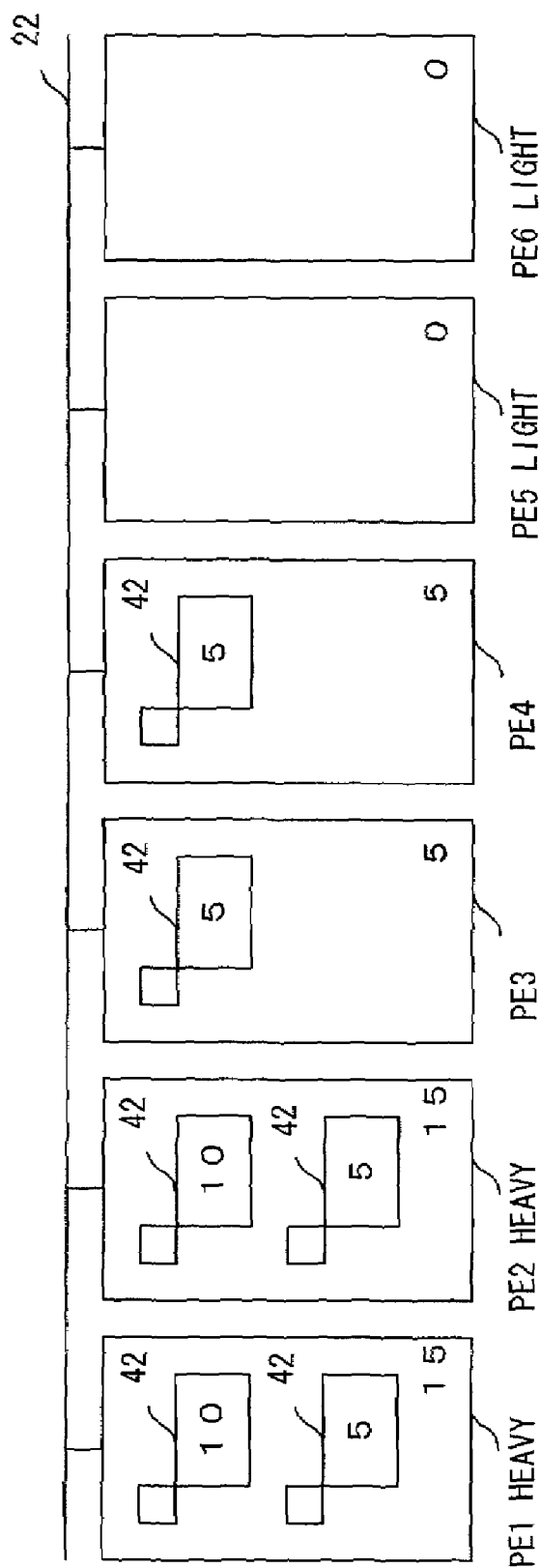
FIG. 9 shows a second load distribution.

Upon termination of the jobs marked with an asterisk "*" with the elapse of time, the state makes a transition to the one shown in FIG. 9. In this state, the loads on the PEs 1 and 2 are heavy, whereas the loads on the PEs 5 and 6 are light (since their loads are "0"). Therefore, as a whole, imbalance in the loads on the PEs is created.

Accordingly, dispersion of the loads on some of the PEs with the dynamic scheduling using migration is considered. For instance, scheduling for respectively moving the job 42 having the load amount "5" on the PEs 1 and 2 to the PEs 5 and 6 is performed, so that the loads on the PEs are averaged as shown in FIG. 10.

Additionally, a system configuration change corresponds to, for example, suspension of a running PE, and an addition of a new PE. If a particular PE is desired to be suspended for reasons such as maintenance, power saving, etc., normally, the job(s) relating to that PE must be forcibly terminated or the termination of the jobs by the PE itself must be waited for. However, with the dynamic scheduling using migration, the related job(s) can be moved to an optimum location. Accordingly, the PE can be suspended while continuing job execution, leading to an efficient operation during a system configuration change.

Figure 10:
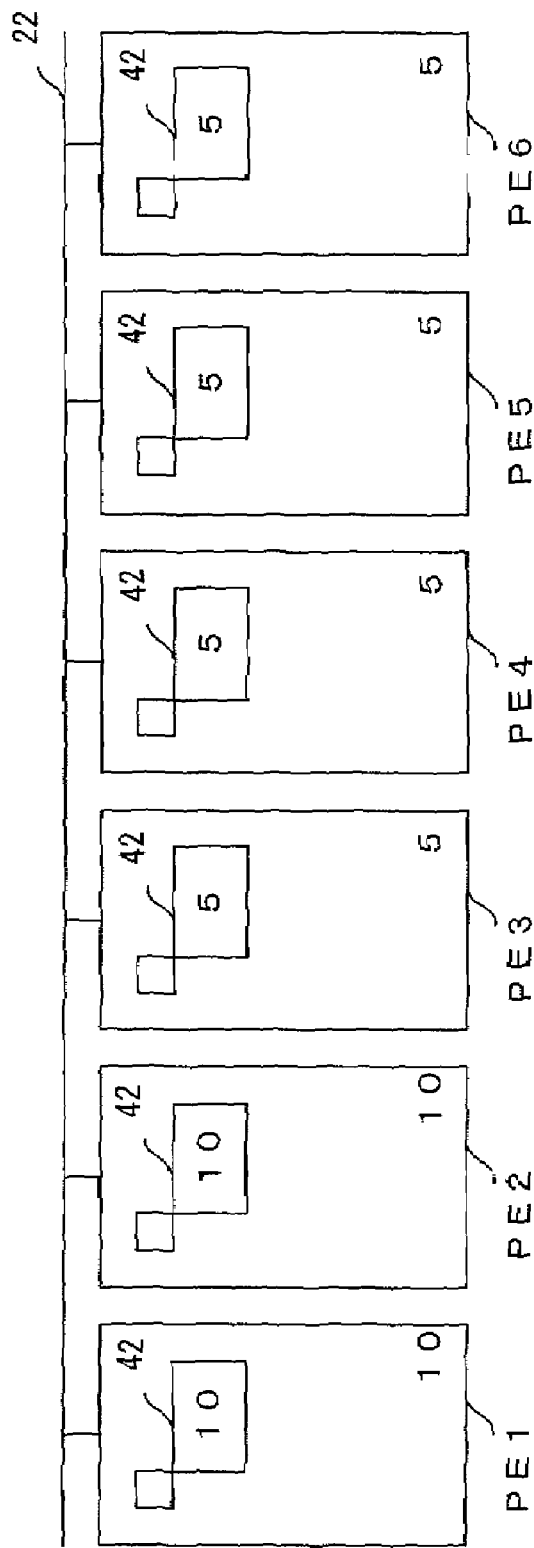
FIG. 10 shows a third load distribution.
Figure 11:
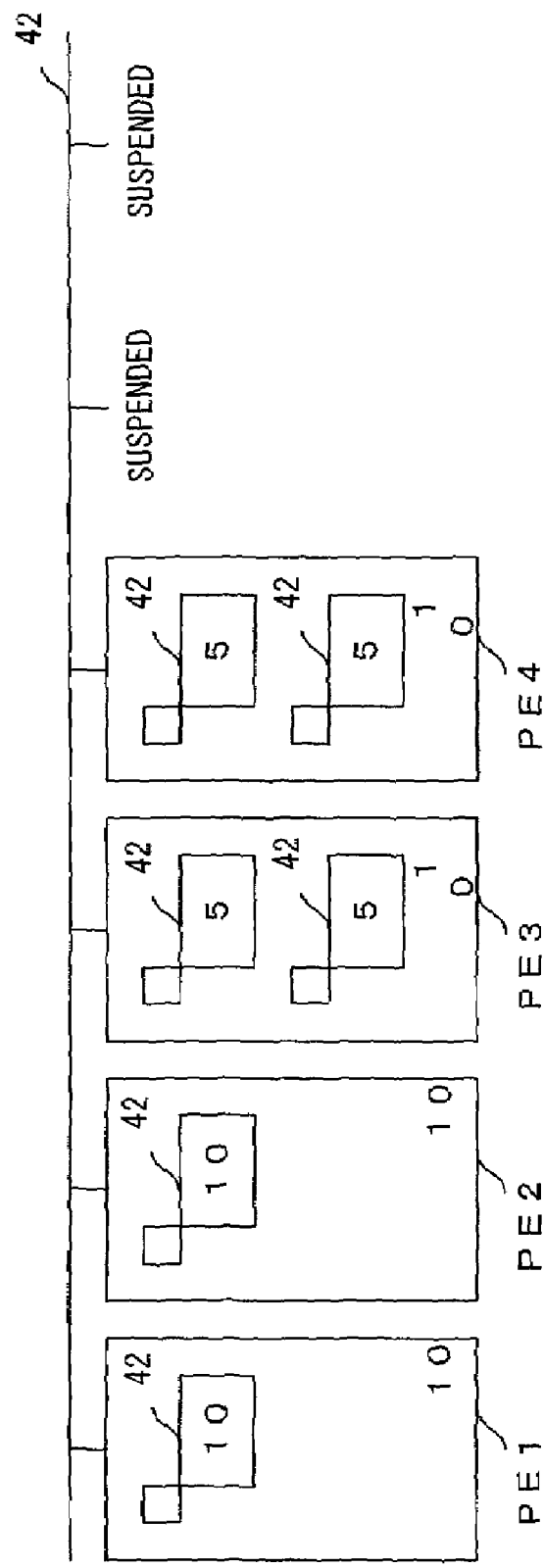
FIG. 11 shows a fourth load distribution.

For example, if the PEs 5 and 6 are desired to be suspended in FIG. 10, scheduling such that the job 42 on the PEs 5 and 6 is moved to the PEs 3 and 4 may be performed. In this way, the PEs 5 and 6 can be immediately suspended as shown in FIG. 11, and moreover, the loads on the other PEs are averaged.

In the meantime, when a job is frozen or moved, a scheduler packs the following data relating to the job based on the assumption that all of the resources used by the target job are released.

(1) User space of a process configuring a job (memory space where an executable object is located, memory space referenced by an executable object, etc.)

(2) Control table within an OS, which relates to a process configuring a job (process management table, etc.)

In case of freezing, packed data is written to an external auxiliary storage device as a file. In case of migration, packed data is transferred to a PE at a migration destination, and unpacked. By packing and saving/transferring all the data relating to a job as described above, the resources occupied by the job on a PE can be completely released.

For a system such as a UNIX system, an ID that is uniquely set within the system to identify a process is assigned to each process configuring a job. Accordingly, a process ID conflict (collision) can possibly occur within the system due to a freezing, an unfreezing or a migration operation.

To avoid such a process ID conflict, for example, the technique disclosed by Japanese Patent Laid-Open Application No. 10-333929 ("Job Execution System and Recording Medium") or by No. 11-338719 ("Computer System") may be used.

According to Japanese Patent Laid-Open Application No. 11-338719, a process ID, which is generated from a job ID, a virtual processor ID of a PE executing the process, and a local process ID within the PE, is assigned to a process configuring a job. Therefore, even if a process having the same local ID as that of the process configuring a job is generated after the job is saved, a process ID conflict does not occur.

Here, a method calculating an execution cost and a migration cost, which is used in the scheduling in the third and the fourth hierarchies, is explained.

The execution cost of a job corresponds to the execution time of the job. Normally, as long as a compiler does not embed an execution cost into an object while compiling the job, the execution cost of the job cannot accurately be calculated in an execution phase. However, since a queuing system manages the memory size of execution of a job so as to use the size as an index for assigning the job, the execution cost can be estimated by referencing this value.

Here, the execution cost is calculated by using the following correlations.

(#1) Normally, the execution cost of a job is proportional to a used memory size.

(#2) The same execution cost is required whenever the same job is executed.

(#3) If a plurality of jobs exist in one PE, an overhead by sequential execution (process switching) within the PE is proportional to the total memory amount used by the jobs existing within the PE.

The total execution cost of all jobs is calculated by quantifying all of these conditions. First of all, the relationship between the memory size value of a job $Mem_{job}$ [byte] and its execution cost T is given by the following equation if it is represented by using the condition (#1) as a criterion.

$$T = Mem_{job} \times \sigma \qquad (2)$$

where the proportional coefficient a is a parameter defining the association between the memory size of a job and its execution cost, and is determined from an actual execution time of the job.

Next, σ is determined by using the condition (#2) as a criterion, and the relationship between the memory size of each job and its execution cost is obtained. Here, database of an actual execution cost of a job is generated as a previous job execution cost history. An average of execution times of the same job is defined to be T in the case where the job is executed by N times.

If the respective N execution times are assumed to be tj (j=1, ..., N), their average is obtained by the following equation.

$$T = (1/N)\Sigma tj \qquad (3)$$

where Σ indicates the total for j. With the equations (2) and (3), the proportional coefficient o for this job is determined as follows.

$$\sigma = (1/N \times Mem_{job})\Sigma tj \qquad (4)$$

Note that, however, a suitable value is set as σ for a job that is first executed, and the accuracy of σ is improved by continuing the operation of the system while updating σ as occasion demands.

Furthermore, even if the size of a job itself is equal, the execution cost of a job may sometimes vary depending on the size of an input data file. In this case, the dispersion value δ of the execution time tj is obtained with the following equation as a selection criterion of data used to update the execution cost database, and data is selected/unselected according to this value.

$$\delta = (1/N)\Sigma(T-tj)^2 \qquad (5)$$

If δ is equal to or larger than a predetermined threshold value, the execution time tj is not used to update the database. If δ is smaller than the predetermined threshold value, the execution time tj is used to update the database. With the above described cost calculation, the shortest (minimum) execution cost of a job can be obtained. However, if a plurality of jobs are executed on PEs, actually, an overhead by memory switching accompanying process switching occurs. This overhead is therefore calculated by using the condition (#3) as a criterion.

Depending on system settings, an overhead time To normally increases in proportion to the memory mount used by a job. If the memory amount used by a job within a certain PE at a certain time point is assumed to be $Mem_{job}$, the total memory amount to be used Mt is given by the following equation.

$$Mt = \Sigma Mem_{job} \qquad (6)$$

where Σ indicates the total sum regarding all the jobs within the PE. The overhead time To can be approximated by using the Mt with the following equation.

$$To = Mt \times \lambda \qquad (7)$$

where the proportional coefficient λ is a constant determined by system settings. In this case, the execution cost of each job, T in the equation (2), is replaced by Cexec in the following equation.

$$Cexec = T + To \qquad (8)$$

Because a scheduling calculation is made behind job execution in parallel, the scheduling overhead required for that calculation is hidden by a job execution cost.

Furthermore, if a job entry operation, or a move operation by freezing/unfreezing or migration is performed, the execution time of a job varies due to the overhead in (#3). Accordingly, an elapsed time is calculated from a job entry time and the current time, and a remaining execution cost is corrected.

As a job migration process, the following two processes are considered.

(a) Unfreezing a job, which is frozen and saved in an external auxiliary storage device, on a PE different from a PE prior to freezing.

(b) Transferring packed data via a network with migration.

As described above, packed data of a job is composed of a memory space and an OS control table. Since the OS control table is invariant regardless of a job, the overhead required for packing only depends on the memory space of a job.

Transfer media in the above described processes (a) and (b) are respectively an external auxiliary storage device and a network. If the data input/output performance (rate) of the external auxiliary storage device is assumed to be IO [byte/sec], a cost Cfreeze required for freezing and a cost Cdefrost required for unfreezing are given by the following equation.

$$Cfreeze = Cdefrost = Mem_{job}/IO \qquad (9)$$

Additionally, if the communication performance (data transfer performance) of the network is assumed to be DT [byte/sec], the cost required for migration is given by the following equation.

$$Cmigrate = Mem_{job}/DT \qquad (10)$$

For example, in a VPP system, IO=60 [Mbyte/sec], whereas DT=32 [Gbyte/sec]. By using the costs given by the equations (9) and (10) as migration costs, dynamic scheduling is performed.

If a time t elapses from the entry time of a job, the remaining time of the job results in Cexec-t. Accordingly, if Cexec-t<Cfreeze or if Cexec-t<Cmigrate, the migration cost of the job is larger than the remaining time. Therefore, dynamic scheduling is not performed.

The above described cost calculations are made in the scheduling in the third and fourth hierarchies. However, these calculations may be applied also to the scheduling in the second hierarchy. In this case, jobs within a queue are evaluated, for example, with the execution cost given by the equation (3), and the jobs are sorted in ascending order of the execution cost.

With the scheduling in the fourth hierarchy, the scheduler relocates the jobs on a PE in consideration of freezing or migration of a job. At this time, attempts are made to increase the operation efficiency of the system by considering also the overhead required for the relocation. Here, the following operations are performed to increase the efficiency.

(1) Accumulating actual data at the time of previous job execution as a job execution history, and collecting statistics of execution times of the same job that was previously executed.

(2) Calculating the cost of operations such as job freezing and migration from the memory size of the job to be operated, and estimating the overhead time required for relocation.

(3) Making a comparison between the statistical information of execution time and the overhead time. Not relocating a job that is expected to terminate prior to the completion of job relocation.

(4) Masking computer resources occupied by a job that is not relocated, at the time of scheduling.

This scheduling is performed, for example, by taking the following cases as an opportunity.

(1) The case where a PE configuration is changed due to system maintenance or a PE fault.

(2) The case where the load state of PEs is monitored, and imbalance in the load state of PEs is created.

(3) The case where a predetermined interval time is set, and scheduling is performed periodically.

The load state monitoring in the above described (2) is performed not only periodically based on the interval time in (3), but each time a job is terminated. Furthermore, the load state is determined with the following method.

Assuming that the total memory amount used by a pth PE is $Mpe_p$, an average load Load of the system composed of P PEs is given by the following equation.

$$\text{Load}=(\lambda 1/P)\Sigma Mpe_p \qquad (11)$$

where the proportional coefficient $\lambda 1$ is a constant determined by system settings, and $\Sigma$ indicates the total sum of P PEs. A dispersion value $\delta_{load}$ of the load on each of the PEs is obtained by using Load with the following equation.

$$\delta_{load}=(1/P)\Sigma(\text{Load}-\lambda 1 Mpe_p)^2 \qquad (12)$$

The system compares this dispersion value $\delta_{load}$ with a predetermined threshold value $\delta 0$. If $\delta_{load}$ is larger than $\delta 0$, the system determines that the load state is imbalanced. Here, a load regarding a used memory amount is monitored However, a load regarding a CPU or a data input/output may be monitored alternatively.

Figure 12:
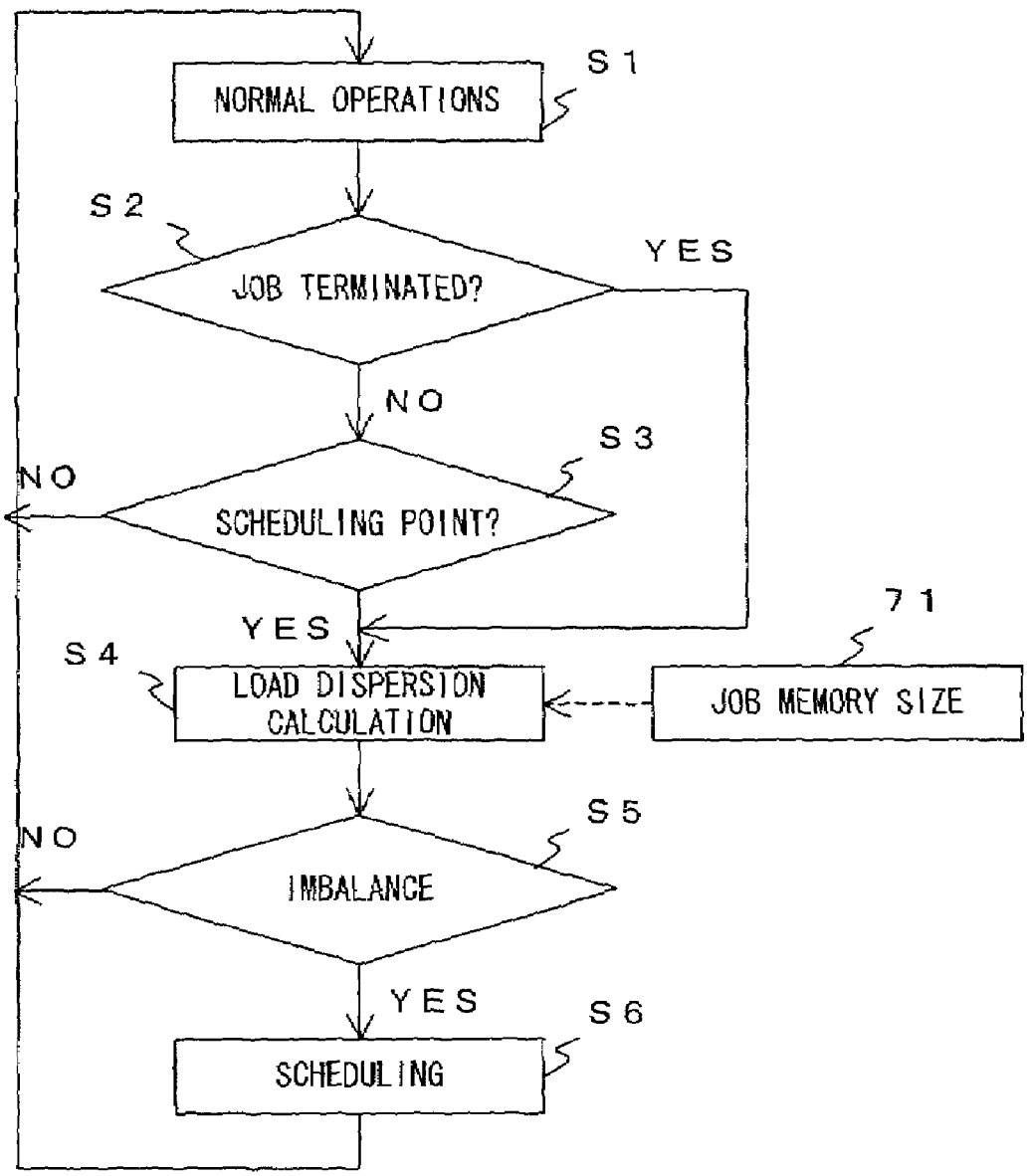
FIG. 12 is a flowchart showing a fourth scheduling opportunity.

FIG. 12 is a flowchart showing the above described scheduling opportunity. The parallel computer system performs normal operations (step S1), and checks whether or not any of jobs is terminated (step S2). If any of the jobs is not terminated, it is then checked whether or not a current time corresponds to a periodical scheduling point (step S3).

If the current time corresponds to the scheduling point, the dispersion value of the load on each PE is calculated by using a memory size 71 of each job (step S4), and it is determined whether or not the load state is imbalanced (step S5). If the load state is imbalanced, scheduling is performed (step S6) and the normal operations are resumed.

If any of the jobs is terminated in step S2, the processes in and after step S4 are performed in succession. If the current time does not correspond to the scheduling point in step S3, and if the load state is balanced in step S5, the normal operations are resumed without performing scheduling.

Figure 13:
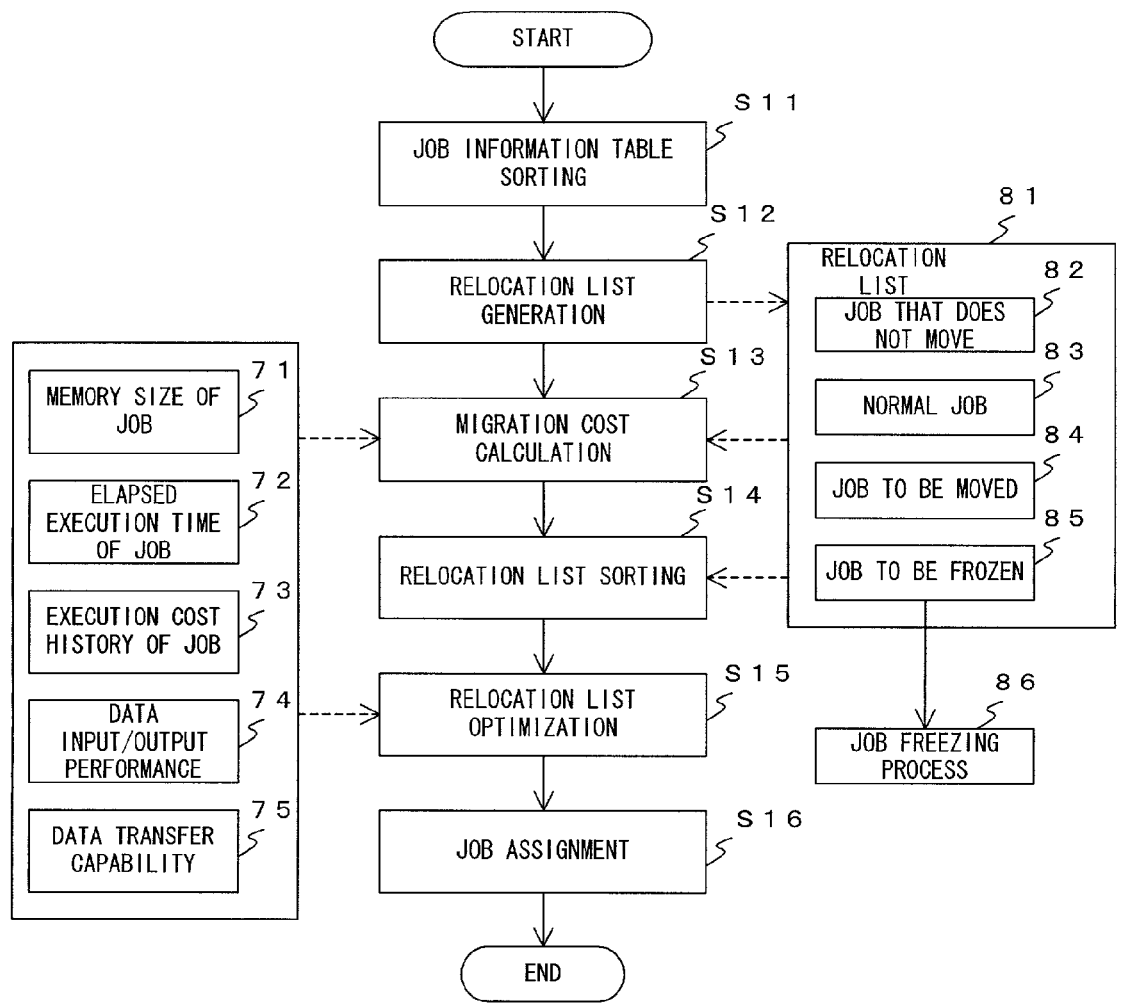
FIG. 13 is a flow chart showing a scheduling process.

FIG. 13 is a flowchart showing the scheduling process performed in step S6 of FIG. 12. The scheduler first sorts the jobs registered to the job information table 61 according to the following priorities (step S11).

(1) Sorting in descending order of a priority (the degree of urgency)

(2) Sorting in descending order of a memory size

A relocation list 71 including jobs relocated on PEs is then generated from the job information table 61 (step S12). Next, the remaining time of each job is estimated and a migration cost is obtained with the above described calculation method based on the memory size 71 of each job, the elapsed execution time 72 of each job, the execution cost history 73 of each job, data input/output performance 74 of an external auxiliary storage device, and the data transfer performance 75 of a network (step S13). Then, it is determined whether or not each job can be moved by making a comparison between the remaining time and the migration cost.

In this way, jobs registered to the relocation list 81 are classified into a job that does not move 82, a normal job 83, a job 84 to be moved, and a job to be frozen 85. The normal job 83 among them corresponds to a job that may or may not move, while the job to be frozen 85 is saved in an external auxiliary storage device with the job freezing process 86.

Next, the jobs in the relocation list 81 are sorted based on a classification result (step S14), and the relocation list 81 is optimized (step S15). Then, the jobs are reassigned based on the relocation list 81 (step S16), and the process is terminated.

FIG. 14 is a flowchart showing the relocation list generation process performed in step S12 of FIG. 13. The scheduler excludes a PE to be suspended (a PE to which a job is not desired to be assigned) for maintenance, etc. from PEs in a system, and generates an operation PE list including the remaining PEs (step S21.

Next, a flag of "a job to be moved" is set for the job assigned to the excluded PE among the jobs in the job information table after being sorted (step S22). This flag indicates a job that is to be forcibly moved. The job for which this flag is set becomes a target of a migration process. Furthermore, a job that is forcibly terminated by suspending a PE is added to a queue.

Then, the jobs in the job information table after being sorted are sequentially assigned from the first job to the PEs within the operation PE list in a tentative manner as long as computer resources permit, and the jobs assigned to the PEs are registered to the relocation list (step S23). The jobs that are not assigned to the PEs are determined to be jobs to be frozen (step S24), and the process is terminated.

In step S13 of FIG. 13, the scheduler obtains a remaining time Cexec-t required until the termination from the execution cost Cexec and the elapsed time t of each job, and calculates a freezing cost Cfreeze of a job to be frozen. If Cfreeze is larger than Cexec-t, the corresponding job is excluded from the jobs to be frozen, and the time at which scheduling is again performed is modified to coincide with the termination of the job.

Next, a migration cost Cmigrate of a job executed by the system is calculated. A flag of "a job that does not move" is set for a job having Cmigrate that is larger than Cexec-t. As a result, a job expected to terminate prior to the completion of migration is excluded from relocation targets, and the resources used by that job are masked.

Additionally, the scheduler sorts the jobs in the relocation list according to the following priorities in step S14 of FIG. 13.

(1) Sorting the jobs so that the group for which the flag of "a job that does not move" is set, the group to which no flag is attached (normal job), and the group for which the flag of "a job to be moved" is set are respectively arranged in an early part, a middle part, and a later part of the list.

(2) Sorting the jobs within each of the groups in descending order of a memory size.

Figure 15:
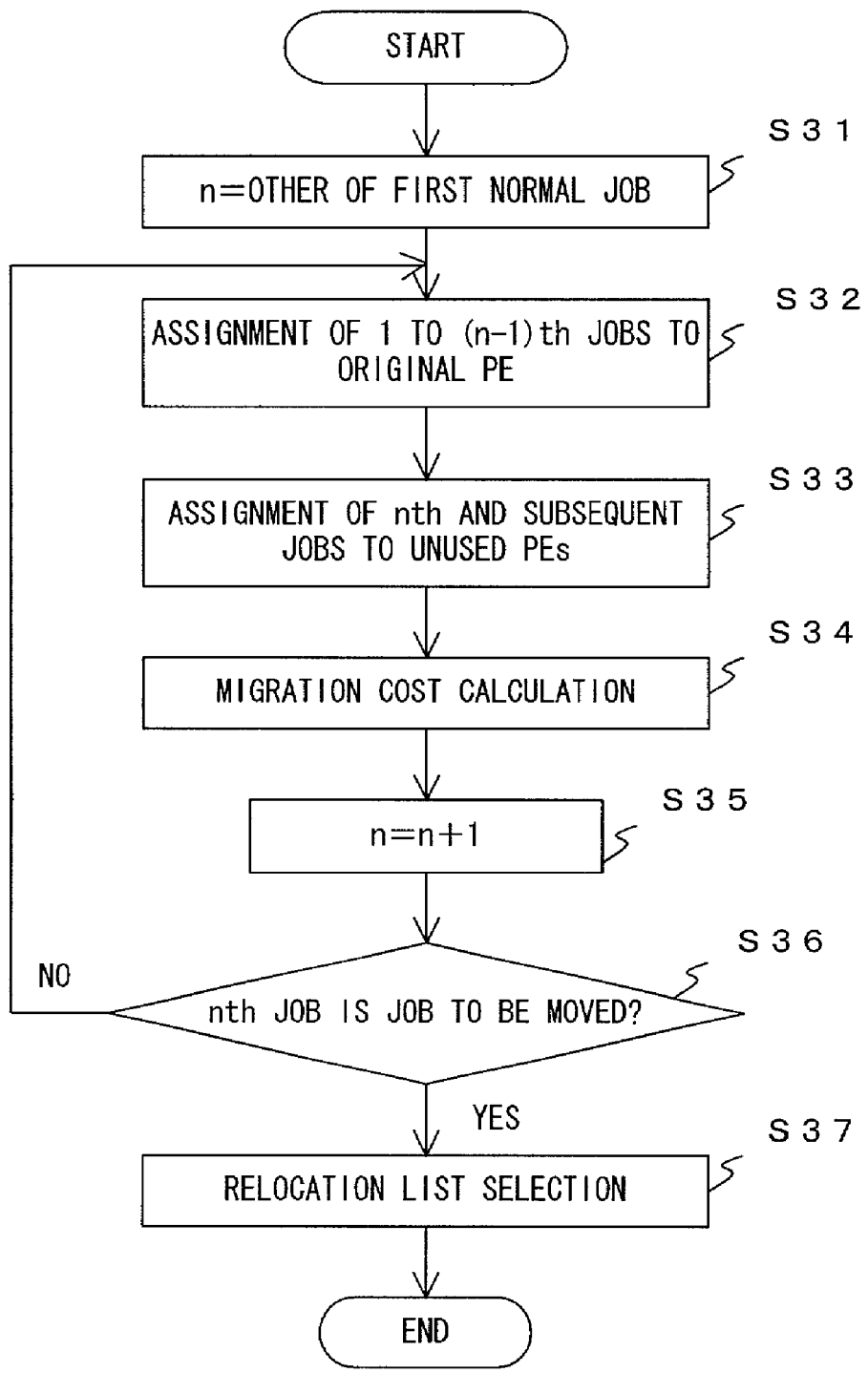
FIG. 15 is a flowchart showing an optimization process.

FIG. 15 is a flowchart showing the optimization process performed in step S15 of FIG. 13. The scheduler first assigns to a variable n the order of the first job within the normal job group in the relocation list after being sorted (step S31), recognizes the first to an (n−1) th job as jobs that do not move, and assigns these jobs to the original PEs (step S32).

Next, nth and subsequent jobs are recognized as jobs to be relocated and assigned to unused PEs, and a new relocation list is generated (step S33). At this time, the jobs are located to average the loads (used memory amounts) in consideration of the PEs the resources of which are occupied by jobs that do not move. Specifically, jobs having a larger memory size are sequentially assigned to a PE group having more of unused resources. Since the jobs are sorted in descending order of a memory size in this case, the jobs may be assigned to the PEs in the sorting order.

Next, the migration costs Cmigrate of the jobs to be moved by being relocated are calculated, and their maximum value Cmax is obtained (step S34). Next, n=n+1 is set (step S35), and it is checked whether or not the flag of "a job to be moved" is set for the nth job (step S36). If the nth job is not a job to be moved, the processes in and after step S32 are repeated. In this way, a plurality of new relocation lists are generated.

If it is checked that the flag of a job to be moved is set in step S36, the job having a minimum value of Cmax within the obtained relocation lists is selected as an optimum relocation list (step S37), and the process is terminated.

FIG. 16 is a flowchart exemplifying the assignment process performed in step S33 of FIG. 15. Here, the number of PEs registered to the operation PE list is assumed to be P. The scheduler first assigns 1 to a variable p indicating a PE number (step S41), and assigns the degree of parallelism of an nth job to a variable a (step S42).

Next, the scheduler makes a comparison between p+a−1 and P (step s43). If p+a−1 is equal to or smaller than P, the scheduler assigns the nth job to the pth to the (p+a−1)th PEs to the nth job (step S44), and sets p=p+a (step S45).

Then, the scheduler sets n=n+1 (step S46), and checks whether or not the nth job exists (step S47). If the nth job exits, the process in and after step S42 are repeated for that job.

If p+a−1 is larger than P in step S43, the nth job is assigned to the first to the (p+a−1−P)th PEs and the pth to the Pth PEs (step S48). Then, p=p+a−P is set (step S49), and the processes in and after step S46 are performed.

If the nth job does not exist in step S47, the process is terminated.

As explained earlier, the scheduling according to this preferred embodiment has the following characteristics.

(1) Performing overall scheduling from static and dynamic viewpoints.

(2) Estimating the execution time of a job, which cannot be determined, by accumulating previous execution information, and feeding the estimated execution time back to the scheduling.

(3) Performing more enhanced scheduling by combining the save operation of a job in an external auxiliary storage device by freezing the job, with the migration of the job between PEs.

(4) Performing scheduling in consideration of an entire system operation such as PE suspension.

By performing such scheduling, computer resources can be effectively used.

Figure 17:
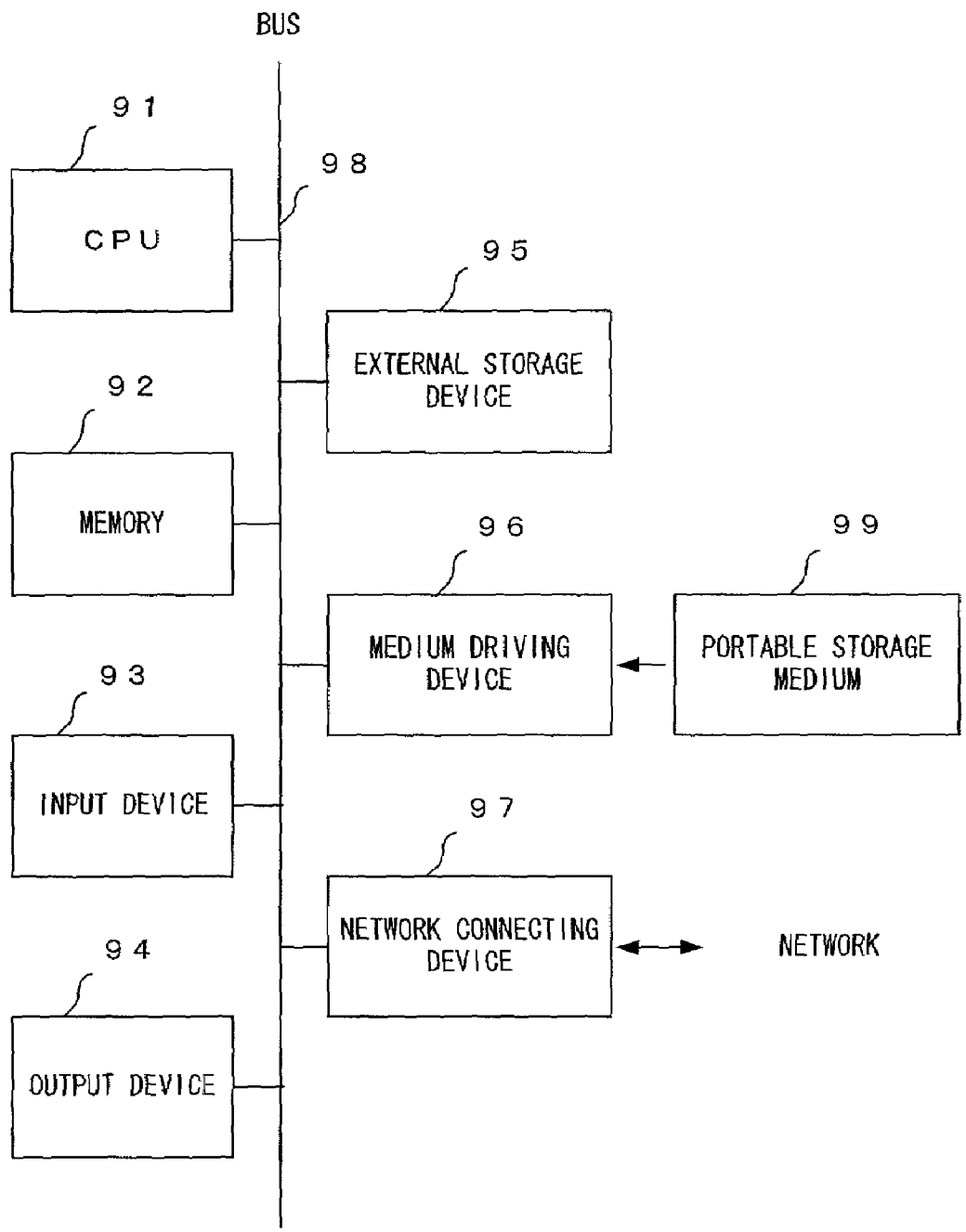
FIG. 17 is a block diagram showing the configuration of an information processing device.

The computer 21 shown in FIG. 2 corresponds to, for example, an information processing device shown in FIG. 17. The information processing device shown in FIG. 17 comprises a CPU (Central Processing Unit) 91, a memory 92, an input device 93, an output device 94, an external storage device 95, a medium driving device 96, and a network connecting device 97, which are interconnected by a bus 98.

The memory 92 includes, for example, a ROM (Read Only Memory), a RAM (Random Access Memory), etc., and stores programs and data used for processes. The CPU 91 performs necessary processes by executing the programs with the memory 92. For example, the scheduler 31 and the queuing system 32, which are shown in FIG. 2, are stored in the memory 92 as the programs.

The input device 93 is, for example, a keyboard, a pointing device, a touch panel, etc., and is used to input an instruction or information from a user. The output device 94 is, for example, a display, a printer, a speaker, etc., and is used to output an inquiry to a user or a process result.

The external storage device 95 is, for example, a magnetic disk device, an optical disk device, a magneto-optical disk device, a tape device, etc. The information processing device stores the above described programs and data in the external storage device 95, and uses the programs and data by loading them into the memory 92 on demand.

The medium driving device 96 drives a portable storage medium 99, and accesses its stored contents. As the portable storage medium 99, an arbitrary computer-readable storage medium such as a memory card, a floppy disk, a CD-ROM (Compact Disk-Read Only Memory), an optical disk, a magneto-optical disk, etc. is used. A user stores the above described programs and data on the portable storage medium 99, and uses the programs and data by loading them into the memory 92 on demand.

The network connecting device 97 is connected to a network 22, and performs data conversion accompanying a communication with a PE. The network connecting device 97 may be connected also to an arbitrary different communications network. In this case, the information processing device receives the above described programs and data from a different device via the network connecting device 97, and uses the programs and data by loading them into the memory 92 on demand.

Figure 18:
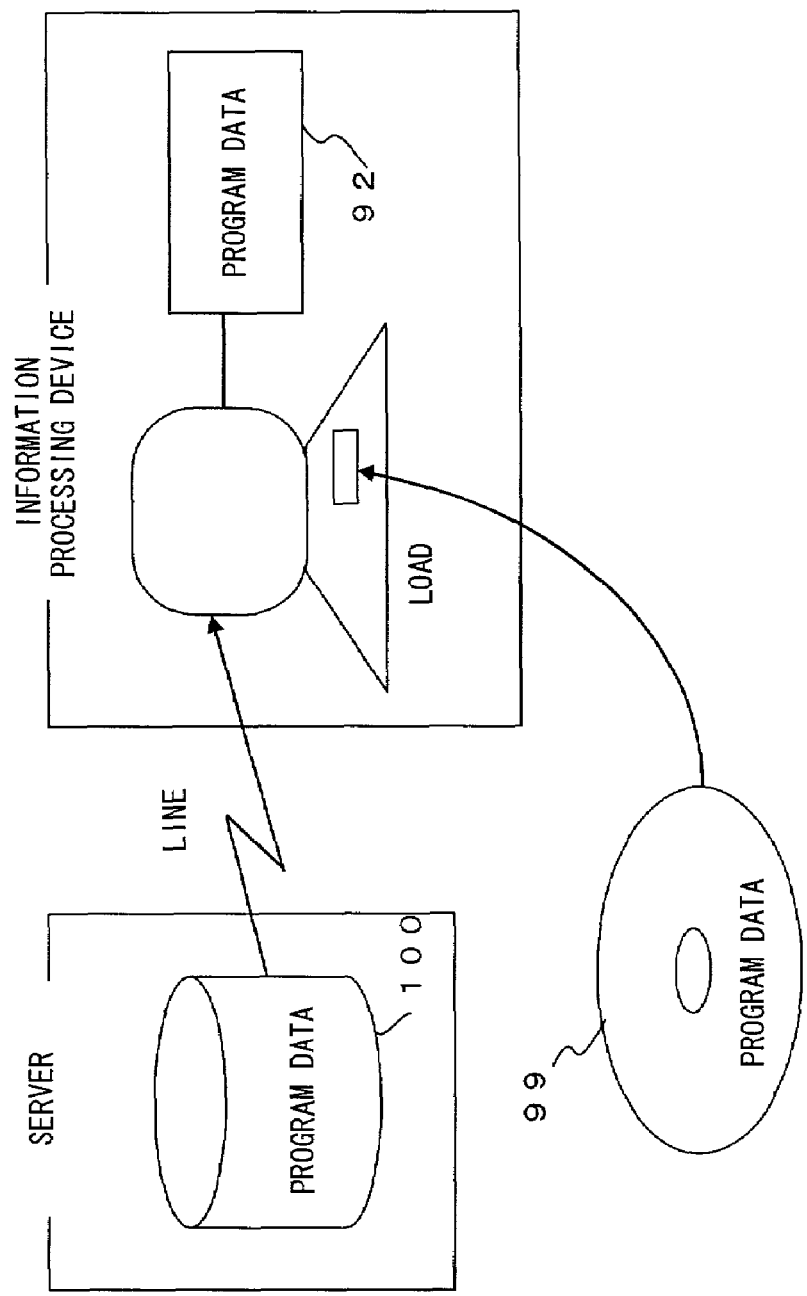
FIG. 18 shows storage media.

FIG. 18 shows computer-readable storage media that can provide the information processing device shown in FIG. 17 with programs and data. The programs and data stored onto the portable storage medium 99 or in a database 101 of a server 100 are loaded into the memory 92. At this time, the server 100 generates a signal for propagating programs and data, and transmits the propagation signal to the information processing device via an arbitrary transmission medium on a network. The CPU 92 executes the programs with the data, and performs necessary processes.

Next, simulation results of the operations of the above described parallel computer system will be described by referencing FIGS. 19 through 21. Details of a model to be simulated are as follows.

(1) The number of PEs: 5, 10, 50

(2) Hardware:
Data input/output performance of an external auxiliary storage device 60 [Mbyte/sec]
Data transfer performance of a communicating device 32 [Gbyte/sec]
Memory capacity of each PE 10 [Gbyte]

(3) Software: An OS that can execute 4 processes in parallel on one PE, and a queuing system (4) Jobs to be entered: The following job group having a random characteristic based on a Poisson distribution
Number of job types: 50
The degree of parallelism: 1 to 10
Memory size: 1 to 10G
variance of the execution cost of the same job: arbitrary
Job arrival time: arbitrary
The number of jobs to be entered: 1,000
Change in a PE configuration: Suspending 10 percent PEs at an arbitrary time, and restoring the PEs into the original configuration at an arbitrary time For the job group of the above described type, a simulation to which the following three types of scheduling are applied is performed.

(1) Sequential execution according to FIFO (2) Scheduling within a queue in consideration of unused resources in a system (3) Hierarchical scheduling according to the above described preferred embodiment (three types of values are used as the threshold value δ0 of the load dispersion value It is assumed that the initial value of Γ in the equation (2) is 1 [sec/byte], the threshold value of the dispersion value δ in the equation (5) is 1250 [sec$^2$], and the proportional coefficient λ in the equation (7) is 0.5 [sec/byte]. Here, sec (second) is used as the time unit in the simulation. However, similar results can be obtained if the time unit is replaced by a different unit such as the number of clock cycles, etc.

Additionally, the threshold value δ0 of the dispersion value $δ_{load}$ in the equation (12), which stipulates an opportunity to perform the scheduling in the fourth hierarchy, is used as a parameter, and three kinds of this value δ0=25, 50, 75 are used. The smaller this value, the more often the scheduling is performed.

Furthermore, if a PE is suspended in the scheduling methods in (1) and (2), the execution time of a running job is monitored, the comparison between the cost required when a job is re-entered and that required when job termination is waited for is made, and a more effective operation is selected.

With the above described simulation, results shown in FIGS. 19, 20, and 21 are obtained. The simulation results shown in FIGS. 19, 20, and 21 represent the results of the simulations of the parallel computer system composed of 5, 10, and 50 PEs.

Here, a total execution time indicates the time required to execute the above described job group. A performance ratio indicates the ratio of the total execution time of a different scheduling method on the condition that the total execution time of the scheduling method in (1) is defined to be 1. The percentage of memory use indicates the ratio of the memory used by the job group. The following tendencies can be determined from these measurement results and execution states.

(1) The larger the scale of the system (the more the number of PEs), the smaller the performance difference caused by a variation of a scheduling method.

(2) If the number of PEs is small in the scheduling in the fourth hierarchy, efficiency increases by setting the threshold value δ0 to a small value and by increasing a scheduling frequency. Or, if the number of PEs is large, the efficiency increases by setting the threshold value δ0 to a large value and by decreasing the scheduling frequency.

(3) If a PE is suspended during operations, a process delay caused by re-entering a job or waiting for job termination occurs frequently with the scheduling methods in (1) and (2). In other words, it is proved that a continuous operation by job migration is effective.

Judging from the above described tendencies, the hierarchical scheduling in (3) is proved to be effective.

According to the present invention, a scheduling error accompanying job execution is reduced by performing dynamic scheduling in consideration of freezing or migration of a running job in a parallel computer system, thereby improving the use efficiency of computer resources.

What is claimed is:

1. A scheduling apparatus performing job scheduling of a parallel computer system having a plurality of processor elements, comprising:
a determining device determining whether or not to move a first job currently being executed by a processor element to a different processor element; and
an assigning device assigning a second job currently being executed to the plurality of processor elements so that a migration process of the first job is performed, if it is determined that the first job is to be moved to the different processor element,
wherein said parallel computer system performs scheduling in respective hierarchies and rearranges jobs according to a respective order of said hierarchies, said hierarchies comprising:
a first hierarchy with sequential process at the start-up of a system from when the system starts up until when a queue is filled with jobs;
a second hierarchy with static scheduling of a job within a queue;
a third hierarchy with dynamic scheduling when a job is entered from a queue into a processor element, that is input/output between the processor element and an external auxiliary storage device; and
a fourth hierarchy with dynamic scheduling of a job currently being executed on a processor element.

2. The scheduling apparatus according to claim 1, further comprising a monitoring device monitoring a load state of the plurality of processor elements, wherein
if a load distribution imbalance occurs between the plurality of processor elements, said assigning device assigns the second job to the plurality of processor elements.

3. The scheduling apparatus according to claim 1, wherein:
said determining device generates a job information table including information of the second job, determines a job to be moved among jobs within the job information table, and generates a relocation list including information of a job relocated on the plurality of processor elements; and
said assigning device assigns the second job to the plurality of processor elements based on the relocation list.

4. The scheduling apparatus according to claim 1, wherein said determining device calculates a cost required for the migration process of the first job, and determines whether or not to move the first job to the different processor element based on a calculated cost.

5. The scheduling apparatus according to claim 1, wherein said determining device estimates an execution cost of the first job based on execution history information of the first job, and determines whether or not to let the first job migrate to the different processor element by using an estimated execution cost.

6. A parallel computer system having a plurality of processor elements, comprising:
a determining device determining whether or not to move a first job currently being executed by a processor element to a different processor element; and
a scheduling device performing scheduling of a second job currently being executed so that a migration process of the first job is performed, if it is determined that the first job is to be moved to the different processor element,
wherein said parallel computer system performs scheduling in respective hierarchies and rearranges jobs according to a respective order of said hierarchies, said hierarchies comprising:
a first hierarchy with sequential process at the start-up of a system from when the system starts up until when a queue is filled with jobs;
a second hierarchy with static scheduling of a job within a queue;
a third hierarchy with dynamic scheduling when a job is entered from a queue into a processor element, that is input/output between the processor element and an external auxiliary storage device; and
a fourth hierarchy with dynamic scheduling of a job currently being executed on a processor element.

7. A computer-readable storage medium on which is recorded a program for causing a computer which perform job scheduling of a parallel computer system having a plurality of processor elements to execute:
determining whether or not to move a first job currently being executed by a processor element to a different processor element; and
assigning a second job currently being executed to the plurality of processor elements so that a migration process of the first job is performed, if it is determined that the first job is to be moved to the different processor element,
wherein said program causes said parallel computer system performs scheduling in respective hierarchies and rearranges jobs according to a respective order of said hierarchies, said hierarchies comprising:
a first hierarchy with sequential process at the start-up of a system from when the system starts up until when a queue is filled with jobs;
a second hierarchy with static scheduling of a job within a queue;
a third hierarchy with dynamic scheduling when a job is entered from a queue into a processor element, that is input/output between the processor element and an external auxiliary storage device; and
a fourth hierarchy with dynamic scheduling of a job currently being executed on a processor element.

8. A scheduling apparatus performing job scheduling of a parallel computer system having a plurality of processor elements, comprising:
determining means for determining whether or not to move a first job currently being executed by a processor element to a different processor element; and
assigning means for assigning a second job currently being executed to the plurality of processor elements so that a migration process of the first job is performed, if it is determined that the first job is to be moved to the different processor element,
wherein said parallel computer system performs scheduling in respective hierarchies and rearranges jobs according to a respective order of said hierarchies, said hierarchies comprising:
a first hierarchy with sequential process at the start-up of a system from when the system starts up until when a queue is filled with jobs;
a second hierarchy with static scheduling of a job within a queue;
a third hierarchy with dynamic scheduling when a job is entered from a queue into a processor element, that is input/output between the processor element and an external auxiliary storage device; and
a fourth hierarchy with dynamic scheduling of a job currently being executed on a processor element.

9. A propagation signal for propagating a computer program to a computer, the program causing the computer to perform:
determining whether or not to move a first job currently being executed by a processor element to a different processor element; and
assigning a second job currently being executed to the plurality of processor elements so that a migration process of the first job is performed, if it is determined that the first job is to be moved to the different processor element,
wherein said program causes said computer performs scheduling in respective hierarchies and rearranges jobs according to a respective order of said hierarchies, said hierarchies comprising:
a first hierarchy with sequential process at the start-up of a system from when the system starts up until when a queue is filled with jobs;
a second hierarchy with static scheduling of a job within a queue;
a third hierarchy with dynamic scheduling when a job is entered from a queue into a processor element, that is input/output between the processor element and an external auxiliary storage device; and
a fourth hierarchy with dynamic scheduling of a job currently being executed on a processor element.

10. A scheduling method performing job scheduling of a parallel computer system having a plurality of processor elements, comprising:

determining whether or not to move a first job currently being executed by a processor element to a different processor element; and assigning a second job currently being executed to the plurality of processor elements so that a migration process of the first job is performed, if it is determined that the first job is to be moved to the different processor element, wherein said program causes said computer performs scheduling in respective hierarchies and rearranges jobs according to a respective order of said hierarchies, said hierarchies comprising:

a first hierarchy with sequential process at the start-up of a system from when the system starts up until when a queue is filled with jobs;

a second hierarchy with static scheduling of a job within a queue;

a third hierarchy with dynamic scheduling when a job is entered from a queue into a processor element, that is input/output between the processor element and an external auxiliary storage device; and a fourth hierarchy with dynamic scheduling of a job currently being executed on a processor element.

\* \* \* \* \*